United States Patent
Howard

(10) Patent No.: US 6,662,572 B1
(45) Date of Patent: Dec. 16, 2003

(54) SOLAR POWERED AUTOMOBILE INTERIOR CLIMATE CONTROL SYSTEM

(75) Inventor: Richard T. Howard, Huntsville, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/340,380

(22) Filed: Dec. 30, 2002

(51) Int. Cl.[7] ............................................... F25B 21/02
(52) U.S. Cl. ........................ 62/3.61; 62/235.1; 62/244
(58) Field of Search ............................. 62/3.61, 235.1, 62/239, 244, 262; 454/131; 126/623, 624; 136/243

(56) References Cited

U.S. PATENT DOCUMENTS

| | | |
|---|---|---|
| 4,100,763 A | 7/1978 | Brody |
| 4,280,330 A | 7/1981 | Harris et al. |
| 4,339,930 A | 7/1982 | Kirts |
| 4,658,597 A * | 4/1987 | Shum ........................ 62/235.1 |
| 4,658,599 A | 4/1987 | Kajiwara |
| 4,955,203 A | 9/1990 | Sundhar |
| 5,205,781 A | 4/1993 | Kanno et al. |
| 5,233,227 A | 8/1993 | Kajimoto et al. |
| 5,237,827 A | 8/1993 | Tchernev |
| 5,588,909 A | 12/1996 | Ferng |
| 5,687,573 A * | 11/1997 | Shih ............................. 62/3.6 |
| 5,826,435 A | 10/1998 | Hange |
| 5,899,081 A | 5/1999 | Evans et al. |
| 6,134,902 A | 10/2000 | Curry |
| 6,216,480 B1 | 4/2001 | Camus et al. |
| 6,459,033 B1 * | 10/2002 | Muller ........................ 136/244 |
| 2002/0023450 A1 | 2/2002 | Ewert et al. |
| 2002/0026797 A1 | 3/2002 | Sundhar |

* cited by examiner

Primary Examiner—William E. Tapolcai
(74) Attorney, Agent, or Firm—James J. McGroary; Donald M. Hill, Jr.

(57) ABSTRACT

There is provided a climate control system for a parked vehicle that includes a solar panel, thermostatic switch, fans, and thermoelectric coolers. The solar panel can serve as the sole source of electricity for the system. The system affords convenient installation and removal by including solar panels that are removably attached to the exterior of a vehicle. A connecting wire electrically connects the solar panels to a housing that is removably mounted to a partially opened window on the vehicle. The thermostatic switch, fans, and thermoelectric coolers are included within the housing. The thermostatic switch alternates the direction of the current flow through the thermoelectric coolers to selectively heat or cool the interior of the vehicle. The interior surface of the thermoelectric coolers are in contact with interior heat sinks that have air circulated across them by an interior fan. Similarly, the exterior surface of the thermoelectric coolers are in contact with exterior heat sinks that have air circulated across them by an exterior fan.

18 Claims, 4 Drawing Sheets

SOLAR POWERED AUTOMOBILE INTERIOR CLIMATE CONTROL SYSTEM

FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefor.

FIELD OF THE INVENTION

The present invention relates generally to a climate control system for a vehicle. More particularly, the climate control system can be used to selectively heat or cool the interior of a vehicle that is not in use.

BACKGROUND OF THE INVENTION

The interiors of parked vehicles often become very hot if parked in the sun during a hot day or become very cold during cold days. Numerous techniques are available on hot days to minimize this problem such as leaving windows cracked to allow the hot interior air to escape, putting up sunshades in the vehicle windows to minimize the amount of sunlight absorbed, or driving the vehicle with the windows down until the hot air escapes. On cold days, vehicles can be started before they are driven to allow the vehicle's engine to heat the interior. Such methods are slow and inefficient because they simply reduce the heat retained or created, or they require running the vehicle engine, which consumes fuel.

A device for heating and cooling the interior of a vehicle is disclosed in U.S. Pat. No. 4,280,330 to Harris et al. wherein thermoelectric coolers are mounted within the roof of the vehicle and which can alternately be used to cool or heat the vehicle interior. This system may be used when the vehicle is not running, but it is powered by a alternator-charged battery which has a limited duration of use between the charging of the battery. A solar powered system for heating and cooling a vehicle interior with thermoelectric coolers is disclosed in U.S. Pat. No. 4,955,203 to Sundhar wherein the system is permanently mounted within the vehicle and the solar panel is used within the vehicle's interior. This system would be very difficult and expensive to install into or remove from a vehicle, and the mounting of the solar panels within the vehicle's interior would diminish the panel's efficiency.

Thus a need exists for an apparatus which selectively cools and heats the interior of a vehicle when the vehicle is not in use and which does not deplete the vehicle battery or consume fuel. Furthermore, a need exists for an apparatus which can be conveniently mounted to or removed from a vehicle.

BRIEF SUMMARY OF THE INVENTION

The invention addresses the above needs and achieves other advantages by providing a vehicle climate control system comprising a solar panel removably attachable to the exterior of a vehicle to serve as a sole source of electricity to the climate control system. At least one thermoelectric cooler is provided for operatively heating or cooling the vehicle interior. The thermoelectric coolers have an interior surface that can include an interior heat sink and an exterior surface that can include an exterior heat sink. An interior fan circulates interior air across the interior surface, and an exterior fan circulates exterior air across the exterior surface. A thermostatic switch regulates the electric current flow to the thermoelectric coolers to cool the interior surface of the thermoelectric coolers when the thermostatic switch detects an interior air temperature greater than a predetermined limit. The thermostatic switch reverses the electric current flow to heat the interior surface of the thermoelectric coolers when the thermostatic switch detects an interior air temperature less than a predetermined limit. In one embodiment, a housing is provided to hold the thermoelectric coolers, interior fan, exterior fan, and thermostatic switch within the housing, creating a unit. The unit can include a removable connection to the solar panel. The unit may be converted from an operable position to a stored position. In the operable position, the unit is preferably mounted upon a partially opened window of the non-running vehicle, creating a barrier between the interior air and the exterior air.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
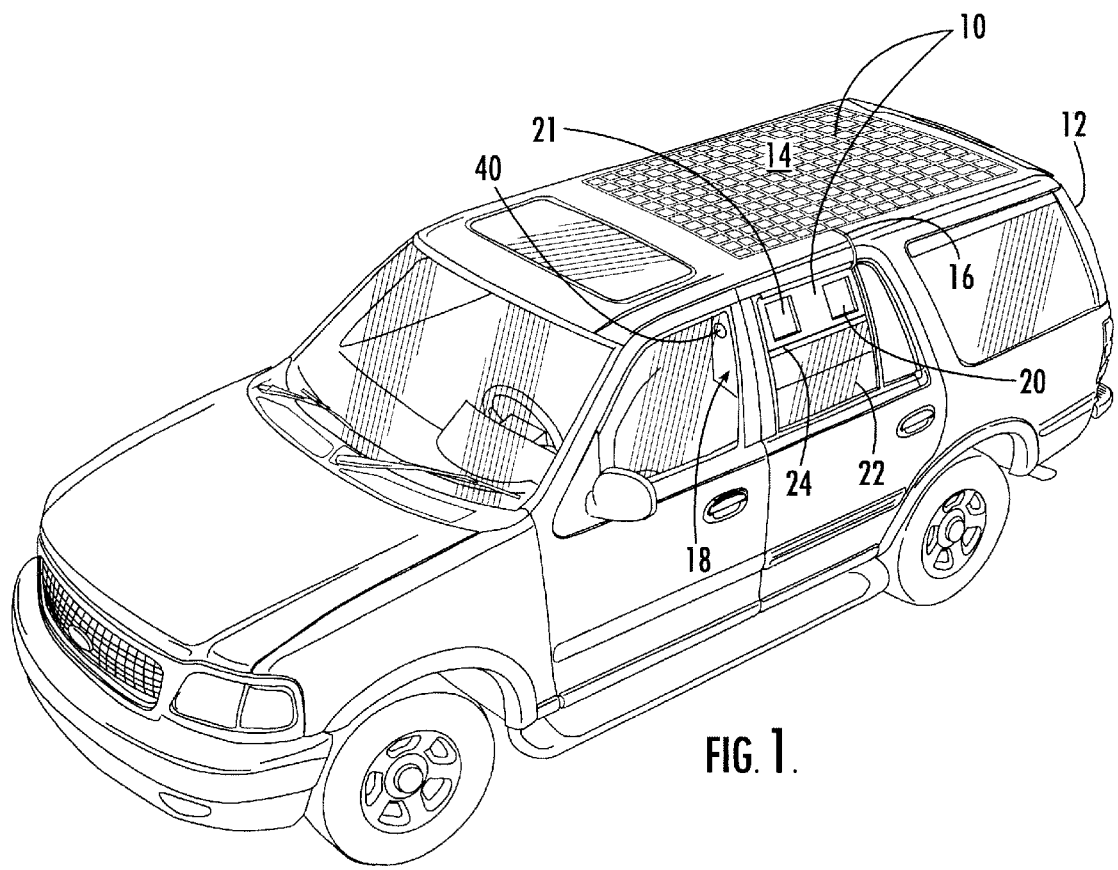
FIG. 1 is a perspective view of the system mounted on a vehicle.

The present invention is directed to a climate control system 10 that includes at least one solar panel 14, and a cooling and heating unit 18 connected to the solar panel 14 by a connecting wire 16, as seen in FIG. 1. The unit 18 includes separate passages for air from the interior of the non-running vehicle 12 to pass through the unit 18 and for air from the exterior of vehicle 12 to pass through the unit 18. The climate control system 10 changes the interior temperature of the vehicle 12 by selectively heating or cooling the interior air that passes through the unit 18.

Figure 2:
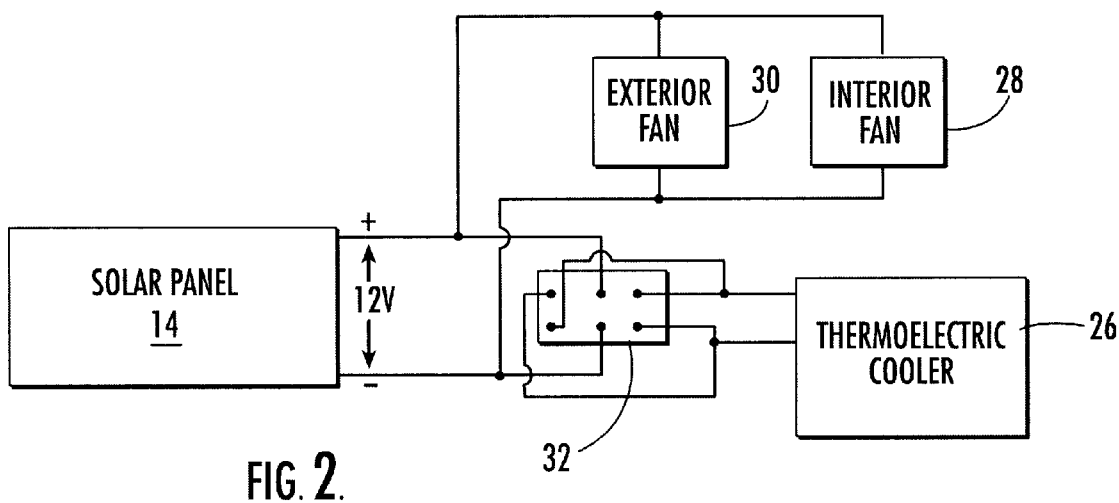
FIG. 2 is an electrical schematic of the climate control system.
Figure 3:
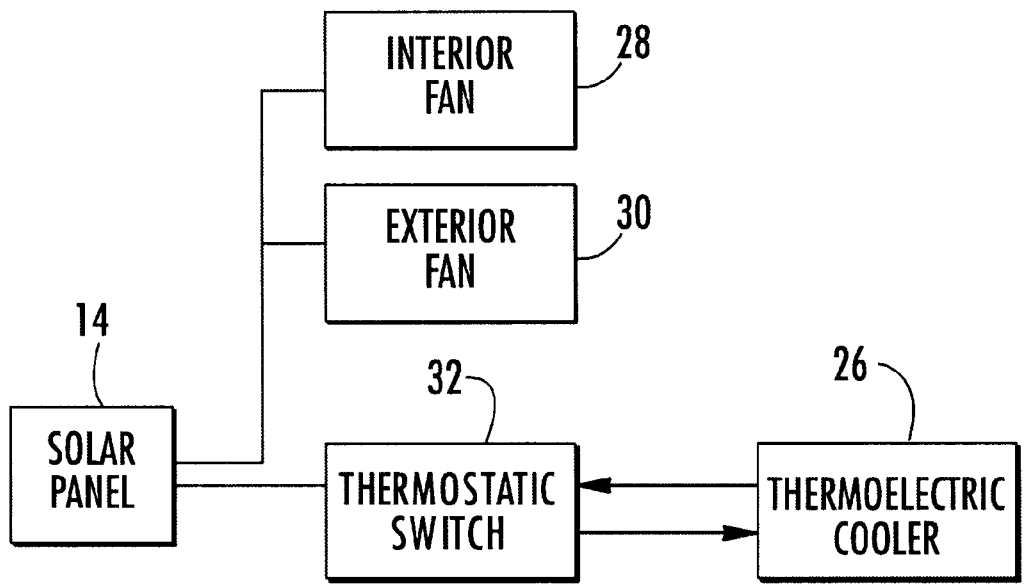
FIG. 3 is a block diagram of the climate control system components.

The operation of the climate control system 10 is illustrated in FIG. 2 and FIG. 3. Electricity produced by the solar panel 14, preferably 12 volts as shown in FIG. 2, is connected in series to an interior fan 28, to an exterior fan 30, and to a thermostatic switch 32 that regulates the direction of the current flow for the thermoelectric coolers 26. The direction of the current through the thermoelectric coolers 26 determines whether the interior air passing through the unit 18 is heated or cooled, as disclosed below.

The solar panel 14 can be removably attached to the exterior of the vehicle 12. In a preferred embodiment illustrated in FIG. 1, the solar panel 14 is removably mounted to the roof of the vehicle 12 by any suitable fastening devices which may include but are not limited to magnets, suction cups, hook and loop fasteners, snaps, tie-wraps, adhesives, bolts, or other fasteners. Alternatively, the solar panel 14 may be permanently mounted to the exterior of the vehicle. The solar panel 14 provides the sole source of electricity for the climate control system, and no battery or other electrical storage devices are required for operation. The solar panel 14 can be flexible such that it can be folded into a compact size for storage. The solar panel 14 may also incorporate a fastening device that allows the user to orient the solar panel 14 on the vehicle 12 in such a way as to maximize the electricity produced by maximizing the amount of solar energy the solar panel 14 receives. Advantageously, the connecting wire 16 is a quick-connect, quick-disconnect cable, which incorporates a quick-connect, quick-disconnect fitting, so that the solar panel 14 can readily be disconnected from the unit 18 for storage.

Figure 4:
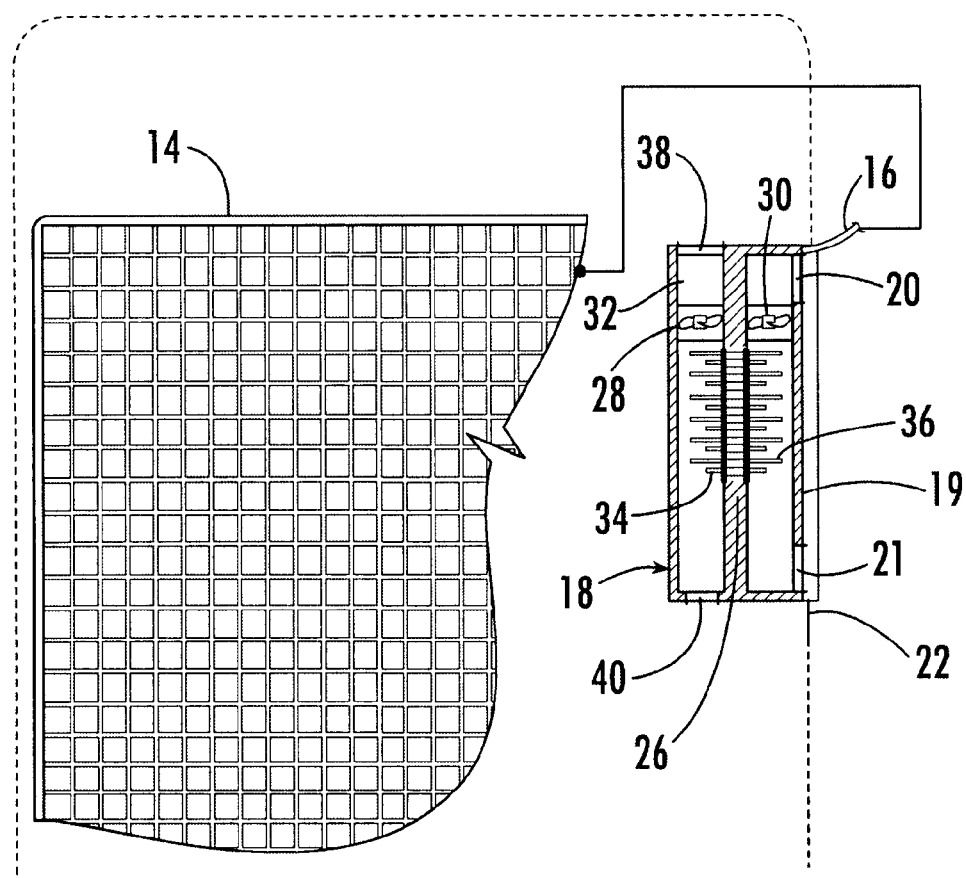
FIG. 4 is a top view of the climate control system with a partial cut-away of the vehicle roof and housing, illustrating the components of the system.

The unit 18 consists of thermoelectric coolers 26, interior fan 28, exterior fan 30, and thermostatic switch 32 all contained within a housing 19, as shown in FIG. 4. The unit 18 also contains wiring to electrically connect the connecting wire 16 to the interior fan 28, exterior fan 30, and the thermostatic switch 32. The electrical current flows in series to the interior fan 28, to the exterior fan 30, and through the thermostatic switch 32 to the thermoelectric coolers 26.

Referring again to FIG. 4, the thermoelectric coolers 26 have interior and exterior surfaces. The interior surface is in contact with interior heat sink 34 and the exterior surface is in contact with exterior heat sink 36. The interior fan 28 circulates air across interior heat sink 34, and exterior fan 30 circulates air across exterior heat sink 36. The fans increase the amount of heat transfer between the air and the heat sinks 34 and 36 to provide improved performance of the system.

The thermoelectric coolers 26 can be any solid-state devices that utilize the Peltier phenomenon such as a ceramic wafer with positive and negative legs of bismuth telluride. The positive leg of such a cooler is doped with boron while the negative leg is doped with arsenic such that its consistency is 99% bismuth telluride and 1% arsenic. In a preferred embodiment, an array of individual thermoelectric coolers 26 is provided. One side of the thermoelectric coolers 26 cools down when electric current is passed through the thermoelectric coolers 26, while the other side heats up. The direction of the current through the thermoelectric coolers 26 dictates which side cools and which side heats, such that reversing direction of the current reverses the cooling and heating of the sides. Advantageously, the heat sinks can be incorporated into the sides of the thermoelectric coolers 26 to maximize the heat exchange between the thermoelectric coolers 26 and the air.

The thermostatic switch 32 detects the vehicle's interior air temperature. The temperatures detected may be relatively warm or cold, and the thermostatic switch 32 alternates the direction of the electrical current flow according to the temperature detected. When the thermostatic switch 32 detects a temperature that is greater than a predetermined level (e.g., 80° F.), it directs the current through the thermoelectric coolers 26 so that an interior surface of the thermoelectric coolers 26 is cooled and an exterior surface of the thermoelectric coolers 26 is heated. The interior heat sink 34 accordingly is cooled and the interior air passing across interior heat sink 34 is cooled; the exterior heat sink 36 dissipates heat to the exterior air. Conversely, when the thermostatic switch 32 detects a temperature that is lower than a predetermined level (e.g., 60° F.), it directs the current through the thermoelectric coolers 26 so that an interior surface of the thermoelectric coolers 26 is heated and an exterior surface of the thermoelectric coolers 26 is cooled. The interior heat sink 34 accordingly is heated and the interior air passing across interior heat sink 34 is heated.

The thermostatic switch 32, the thermoelectric coolers 26, the fans 28 and 30, and the heat sinks 34 and 36 are all contained within a housing 19 of unit 18. Connecting wire 16 conducts the electricity from solar panels 14 to the thermostatic switch 32 and fans 28 and 30 contained within the housing 19. Housing 19 also includes openings for the passage of air, which include exterior air intake port 20, exterior air discharge port 21, interior air intake port 38, and interior air discharge port 40. Interior fan 28 draws interior air into the housing through interior air intake port 38 and passes the interior air across the interior heat sink 34 and out through interior air discharge port 40. Likewise, exterior fan 30 draws exterior air into the housing through exterior air intake port 20 and passes the exterior air across the exterior heat sink 36 and out through exterior air discharge port 21. The housing 19 provides a barrier between the interior air and the exterior air to keep the interior air segregated from the exterior air. Thermostatic switch 32 is preferably mounted within the housing 19 between the interior air intake port 38 and interior fan 28.

Referring to FIG. 1, the unit 18 is preferably configured to mount upon the top of a partially opened window 22 of a parked vehicle 12. However, the unit 18 may be located on the vehicle 12 at any location conducive to the function of the climate control system 10. In a preferred embodiment the window 22 is partially opened and the unit 18 rests upon the window 22 with a flange 24 and fits within the window gasket to prevent the unit 18 from falling and to separate the interior air from the exterior air. To remove and store the climate control system 10 in a preferred embodiment, the connecting wire 16 is unplugged from the unit 18 using the quick-connect, quick-disconnect fitting, the window 22 is lowered, the unit 18 is removed and stored, and the solar panel 14 is unfastened, folded, and stored. To return the climate control system to the operable position, the process is reversed.

Many modifications and other embodiments of the inventions set forth herein will come to mind to one skilled in the art to which these inventions pertain having the benefit of the teachings presented in the foregoing descriptions and the associated drawings. For example, although the described system 10 can heat as well as cool the vehicle interior, the invention encompasses systems that only heat or only cool. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vehicle climate control system for heating or cooling air in a passenger compartment of a vehicle, comprising:
   at least one solar panel structured and arranged to be removably attached to an exterior of a vehicle to serve as a sole source of electricity to the climate control system;
   at least one thermoelectric cooler connected to said at least one solar panel and operable to cool on one side and heat on an opposite side thereof when an electric current is passed through said at least one thermoelectric cooler;

at least one fan connected to said at least one solar panel; and a housing containing said at least one thermoelectric cooler and the fan so as to form a unit, the housing defining an air intake port and an air discharge port and a flow passage therebetween, the fan being arranged to draw air into the intake port and move the air through the flow passage and out the discharge port, said at least one thermoelectric cooler being arranged such that one side thereof is exposed to air moving through the flow passage;

wherein the unit is convertible from a stored position to an operable position, the unit in the operable position being removably mounted to the vehicle in such a manner that the air intake port draws air from the passenger compartment of the vehicle and moves said air over the one side of said at least one thermoelectric cooler and returns said air to the passenger compartment of the vehicle, and such that the opposite side of said at least one thermoelectric cooler is isolated from the air in the passenger compartment, whereby passenger compartment air is recirculated through the flow passage and heated or cooled by said at least one thermoelectric cooler so as to heat or cool the passenger compartment.

2. The vehicle climate control system of claim 1, wherein the housing is structured and arranged such that the unit is mountable in a window opening of the vehicle.

3. The vehicle climate control system of claim 2, wherein the housing is structured and arranged to mount between a window frame and a partially opened glass pane of a vehicle window.

4. The vehicle climate control system of claim 3, wherein the housing is structured and arranged to provide a barrier between air inside the passenger compartment and air outside the passenger compartment.

5. The vehicle climate control system of claim 4, wherein the housing defines a second flow passage, said at least one thermoelectric cooler being arranged such that the opposite side thereof is exposed to air flowing through the second flow passage, and further comprising a second fan that in the operable position of the unit draws air from outside the passenger compartment and moves the air through the second flow passage over the opposite side of said at least one thermoelectric cooler and discharges the air outside the passenger compartment.

6. The vehicle climate control system of claim 5, further comprising a thermostatic switch connected to the fans and said at least one thermoelectric cooler, the thermostatic switch being operable to regulate current flow through said at least one thermoelectric cooler.

7. The vehicle climate control system of claim 6, wherein the thermostatic switch is operable to control said at least one thermoelectric cooler so as to alternatively heat or cool the air in the passenger compartment.

8. The vehicle climate control system of claim 7, wherein the thermostatic switch is operable to cause current to be passed in one direction through said at least one thermoelectric cooler for heating the air in the passenger compartment, and to cause current to be passed in an opposite direction through said at least one thermoelectric cooler for cooling the air in the passenger compartment.

9. The vehicle climate control system of claim 8, wherein the thermostatic switch is operable to detect a temperature indicative of conditions within the passenger compartment and to cause the current to be passed in said one direction so as to heat the air when the temperature is below a predetermined limit, and to be passed in said opposite direction so as to cool the air when the temperature is above a predetermined limit.

10. The vehicle climate control system of claim 1, wherein said at least one solar panel is connected to the unit by a quick-connect, quick-disconnect cable.

11. A vehicle climate control system for heating or cooling air in a passenger compartment of a vehicle, comprising:

at least one solar panel structured and arranged to be removably attached to an exterior of a vehicle to serve as a sole source of electricity to the climate control system;

at least one thermoelectric cooler connected to said at least one solar panel and operable to cool on one side and heat on an opposite side thereof when an electric current is passed through said at least one thermoelectric cooler;

at least one fan connected to said at least one solar panel;

a thermostatic switch connected to said at least one fan and said at least one thermoelectric cooler, the thermostatic switch being operable to regulate current flow through said at least one thermoelectric cooler; and a housing containing said at least one thermoelectric cooler, said at least one fan, and the thermostatic switch so as to form a unit, the housing defining an air intake port and an air discharge port and a first flow passage therebetween, the fan being arranged to draw air into the intake port and move the air through the first flow passage and out the discharge port, said at least one thermoelectric cooler being arranged such that one side thereof is exposed to air moving through the first flow passage;

wherein the housing defines a second flow passage, said at least one thermoelectric cooler being arranged such that the opposite side thereof is exposed to air flowing through the second flow passage, and further comprising a second fan that in the operable position of the unit draws air from outside the passenger compartment and moves the air through the second flow passage over the opposite side of said at least one thermoelectric cooler and discharges the air outside the passenger compartment;

wherein the thermostatic control is operable to detect a temperature indicative of conditions within the passenger compartment and to cause the current to be passed in a one direction so as to heat the air when the temperature is below a predetermined limit, and to be passed in an opposite direction so as to cool the air when the temperature is above a predetermined limit;

wherein the unit is convertible from a stored position to an operable position, the unit in the operable position being removably mounted to the vehicle in such a manner that the air intake port draws air from the passenger compartment of the vehicle and moves said air over the one side of said at least one thermoelectric cooler and returns said air to the passenger compartment of the vehicle, and such that the opposite side of said at least one thermoelectric cooler is isolated from the air in the passenger compartment, whereby passenger compartment air is recirculated through the flow passage and heated or cooled by said at least one thermoelectric cooler so as to heat or cool the passenger compartment;

wherein the housing is structured and arranged such that the unit is mountable between a window frame and a partially opened glass pane of a vehicle window so as to provide a barrier between air inside the passenger compartment and air outside the passenger compartment.

12. A method of conditioning air within a passenger compartment of a non-running vehicle, comprising the steps of:
   mounting a solar panel to an exterior of the vehicle by releasable fastening devices permitting the solar panel to be dismounted after use and stored;
   mounting a conditioning unit in a window opening of the vehicle, the conditioning unit having a housing structured and arranged to provide a barrier between air inside the passenger compartment and air outside the passenger compartment, the housing defining an interior flow passage having an intake port and a discharge port respectively arranged to receive air from and discharge air into the passenger compartment, the unit further comprising an electrically powered interior fan arranged to move air through the interior flow passage, and a thermoelectric cooling device having one side in heat-transfer relationship with air in the interior flow passage and an opposite side in heat-transfer relationship with air outside the passenger compartment, the thermoelectric cooling device being operable to cool one of the sides thereof and to heat the other of the sides thereof when electric current is passed through the device; and
   removably connecting an electrically conductive cable between the solar panel and the conditioning unit so as to electrically power the fan and the thermoelectric cooling device, whereby air from the passenger compartment is recirculated through the interior flow passage and is heated or cooled by the thermoelectric cooling device.

13. The method of claim 12, wherein the conditioning unit is provided to have an exterior flow passage having an intake port and a discharge port respectively arranged to receive air from and discharge air to an exterior of the passenger compartment, and an electrically powered exterior fan for moving air through the exterior flow passage, and wherein the solar panel is connected to power the exterior fan.

14. The method of claim 13, wherein the conditioning unit further comprises a thermostatic switch connecting the electrically conductive cable from the solar panel to the thermoelectric cooling device so as to regulate current flow through the thermoelectric cooling device.

15. The method of claim 14, wherein the thermostatic switch is provided to control the thermoelectric cooling device so as to alternatively heat or cool the air from the passenger compartment.

16. The method of claim 15, wherein the thermostatic switch is operable to detect a temperature indicative of conditions within the passenger compartment and to cause the current to be passed in a direction so as to heat the passenger compartment when the temperature is below a predetermined limit, and to be passed in an opposite direction so as to cool the passenger compartment when the temperature is above a predetermined limit.

17. The method of claim 13, wherein the solar panel provides the sole source of electricity for the conditioning unit.

18. The method of claim 17, wherein the electrically conductive cable between the solar panel and the conditioning unit is a quick-connect, quick-disconnect cable.

* * * * *